April 16, 1935.  M. W. BOWEN  1,997,923
CONTROL DEVICE
Filed Nov. 25, 1932   3 Sheets-Sheet 1
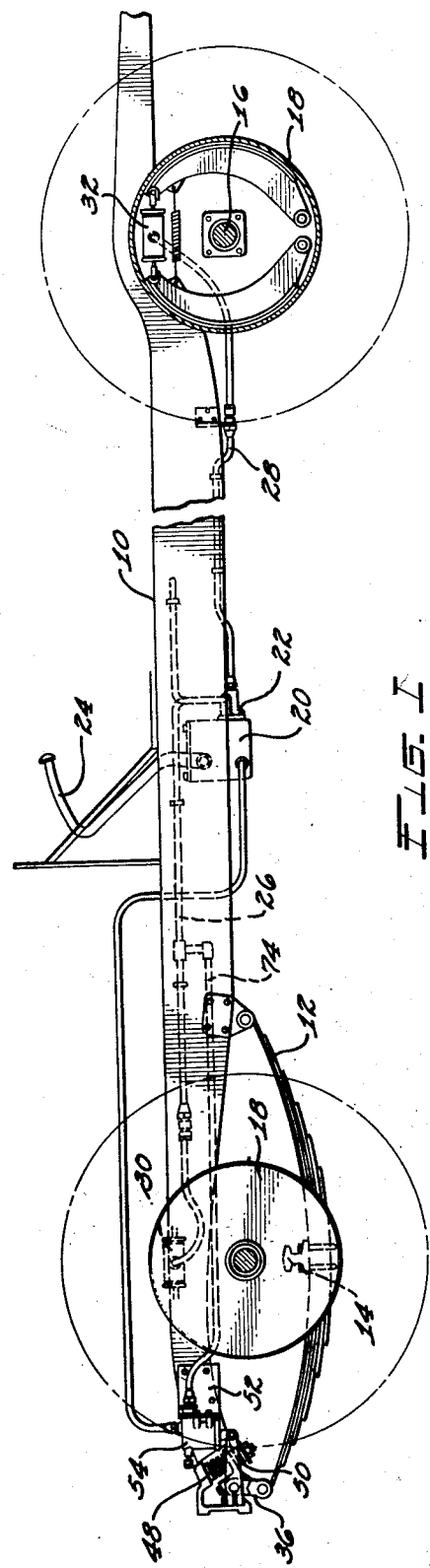
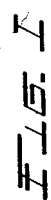
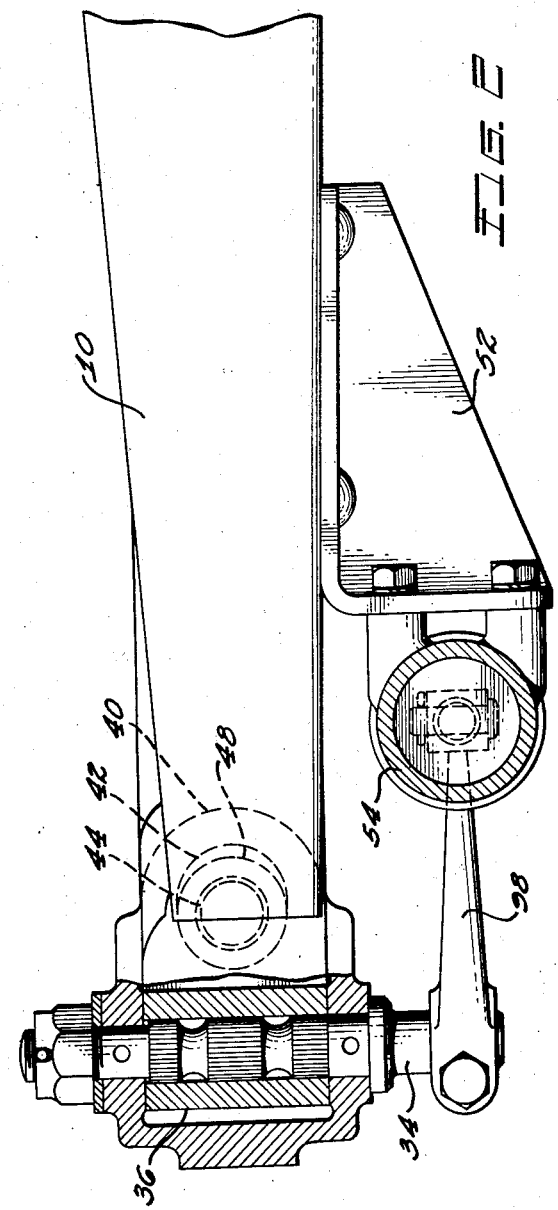
INVENTOR
MYRON W. BOWEN.
BY O. H. Fowler
ATTORNEY

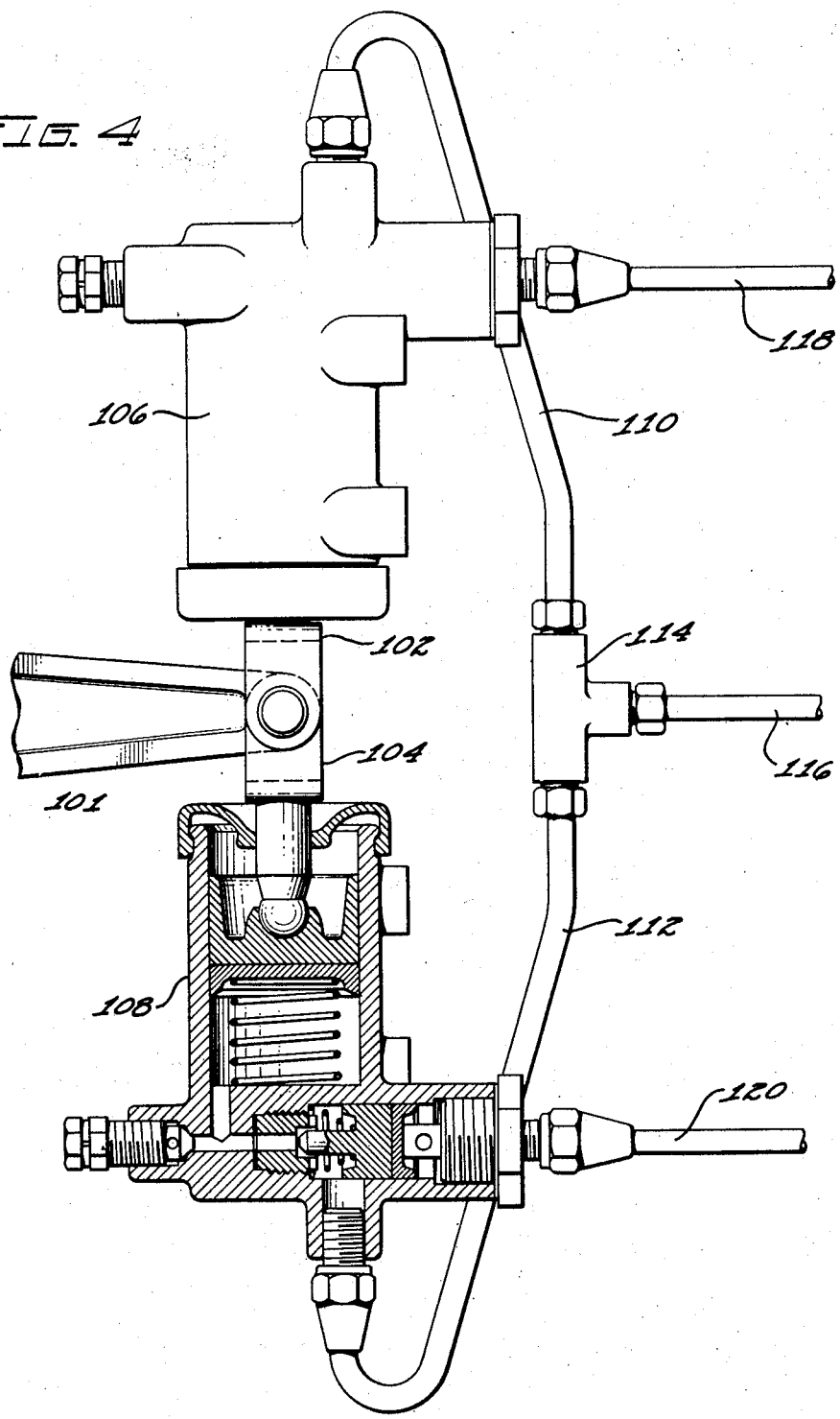

Patented Apr. 16, 1935

1,997,923

UNITED STATES PATENT OFFICE 1,997,923

CONTROL DEVICE

Myron W. Bowen, Detroit, Mich., assignor to Hydraulic Brake Company, Detroit, Mich., a corporation of California Application November 25, 1932, Serial No. 644,383

5 Claims. (Cl. 280—124)

This invention relates to control devices for motor vehicles and more particularly to means for controlling movement of a shackle for one of the front springs of a vehicle.

With the introduction of balloon tires for motor vehicles, there appeared various vibrations known generally to automotive engineers as shimmy, wheel tramp, wheel wobble, steering wheel kick, etc. Of these, shimmy and wheel tramp are perhaps the most serious.

Shimmy is generally started by unevenness of the ground over which the vehicle is proceeding. A very significant characteristic of this phenomenom is that when the critical period is reached, even on a smooth concrete road, the vibration will begin without delay and grow to a violent proportion and is accompanied by axle oscillations transversely about a horizontal axis longitudinally of the vehicle with the wheels bouncing alternately. The front end of the chassis oscillates in a similar manner, but on the side where the chassis is moving downward, the axle is moving upward, all the while the wheel and spindles are operating about the steering knuckle pivots with corresponding movements of the steering wheel even though strongly gripped in the driver's hands. This is extremely serious and dangerous.

Heretofore many devices have been developed to overcome these disadvantages, among which is a modification of the conventional spring suspension in which the front end of one of the front springs is attached to the fork of the chassis frame by a shackle yieldingly retained against movement. This device has been applied to a number of motor vehicles with some success. However, it has not proved entirely satisfactory because motor vehicles equipped with such devices invariably duck to the left on heavy brake applications.

It has been found that devices of this character give fair results for a limited time but are obviously of a temporary character as to endurance. A car equipped with spring shackles of this character invariably starts to show a tendency to go to the left on heavy braking applications after a use of approximately two thousand miles. The present invention aims to overcome these objections and to that end the applicant has provided means for effectively locking the shackle against movement simultaneously upon brake application, thereby avoiding the unbalanced condition incident to shimmy, wheel tramp, wheel wobble, etc.

An object of the invention is to provide a control means for a vibration damper.

Another object of the invention is to provide a control means for a vibration damper including means for securing the damper against movement.

Another object of the invention is to provide a hydraulic control means for a vibration damper including means for effectively securing the damper against movement.

A further object of the invention is to provide a braking system, a vibration damper, and means for controlling the damper and braking system simultaneously.

A further object of the invention is to provide a hydraulically operated braking system for a motor vehicle, including an operating means, a vibration damper for a part of the vehicle, and means coupled in the braking system for controlling the vibration damper operatable simultaneously with brake applications.

Other objects and advantages of the invention will more fully appear from the following description taken in connection with the accompanying drawings forming a part of this specification, and in which, Figure 1 is a side elevation of a motor vehicle chassis equipped with the invention.

Figure 2 is a top plan view of one fork of the chassis frame illustrating the invention as applied, a part of the fork being broken away and a part in section.

Figure 4 illustrates a modification of the invention.

Figure 3:
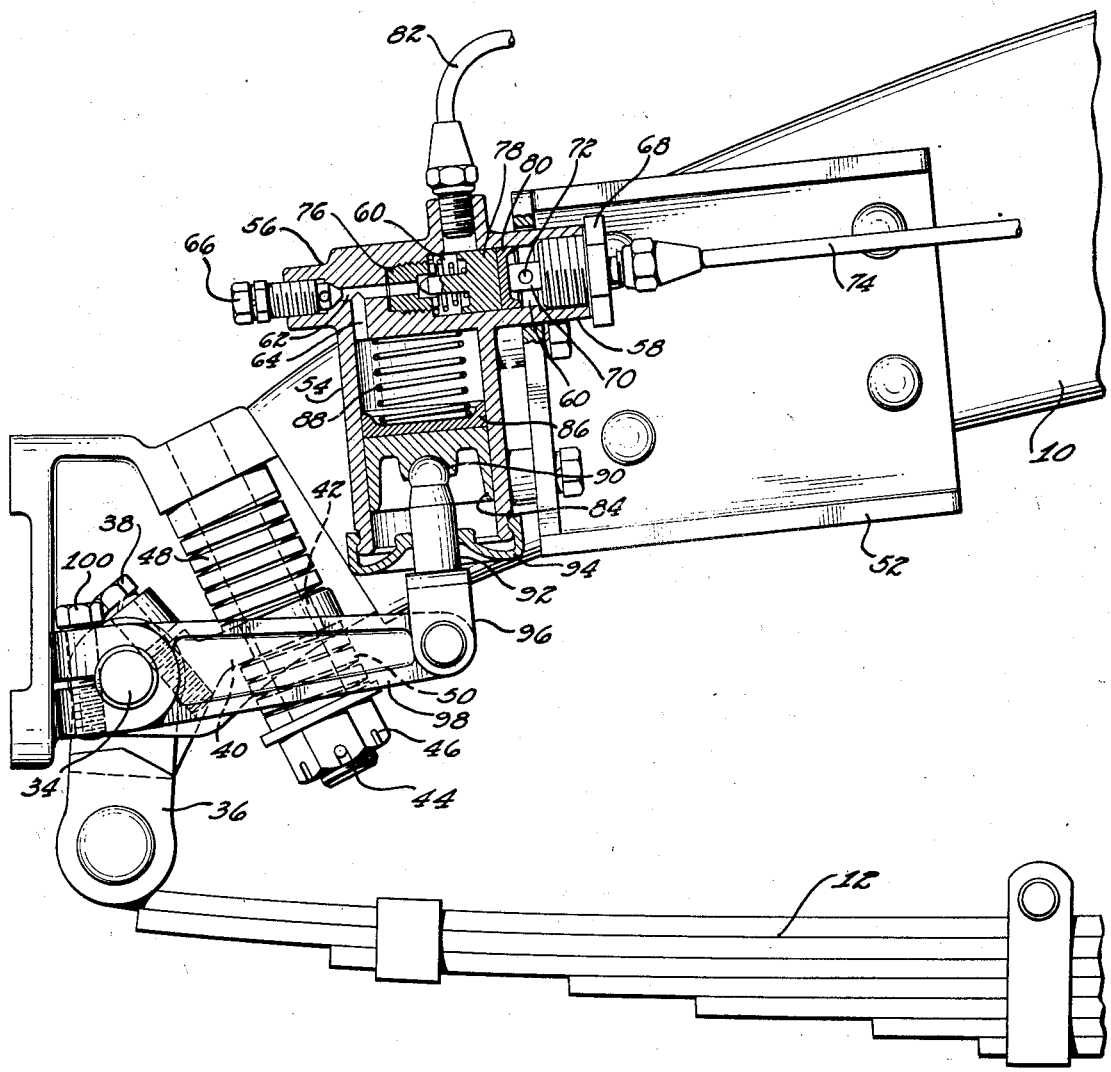
Figure 3 is a side elevation of one fork of the chassis frame and its supporting spring illustrating the invention as applied, the actuating cylinder of the device being shown in section.

Referring to the drawings for more specific details of the invention, 10 represents a side rail of a motor vehicle chassis frame. It is, of course, to be understood that the frame includes two side rails arranged in parallel relation and connected by suitable cross bars and braces. The frame is supported by springs 12, only one of which is shown, suspended from a front axle 14 and a rear axle 16, and the axles have positioned thereon for rotation the conventional wheels equipped with tires.

The wheels have associated therewith brakes 18, preferably of the hydraulically operated type. As shown, the brake operating mechanism includes a fluid supply tank 20 providing a suitable housing for a master cylinder 22, operable through a foot pedal lever 24. The master cylinder is connected by suitable pipe lines 26 and 28 to cylinders 30 and 32 for actuating the brakes associated with the front and rear wheels respectively.

One of the forks of the chassis frame supports for rotation a shackle bolt 34. This bolt receives one end of a shackle 36, the other end of which is attached to an eye in one end of the adjacent spring 12. As shown, the shackle 36 is keyed to the shackle bolt 35 by a screw 38 and is provided with an arm 40 having an opening 42. The arm extends rearwardly beneath the fork of the chassis frame and a bolt 44 suitably secured to the fork extends through the opening in the arm with sufficient clearance to provide for free movement of the arm.

The bolt 44 has sleeved thereon between the fork and the arm 40 and between the arm 40 and a nut 46 threaded on the bolt 44, short coiled spring sections 48 and 50. These springs absorb shock and efficiently damp vibrations due to shimmy, wheel tramp, wheel wobble, steering wheel kick, and so forth.

This structure has been applied to motor vehicles with some success. However, it has not proved entirely satisfactory because motor vehicles equipped with such devices invariably duck to one side on heavy brake applications. It has been found that this objectionable condition may be avoided by the introduction of a relatively simple means for controlling movement of the shackle including means for effectively locking the shackle against movement, the control means operating concomitantly with brake applications.

As shown, the control means for the shackle includes a suitable bracket 52 bolted or otherwise secured to the frame. This bracket supports a cylinder 54 having a head 56 provided with a lateral projection 58. The lateral projection has formed therein a cylinder 60 extending into the head of the cylinder 54 and communicating with a diametral passage 62 which in turn communicates with a passage 64 communicating with the cylinder 54. The outer end of the passageway 62 has threaded therein a plug 66 which may be removed when it is desired to bleed the system.

The cylinder 60 has threaded in its outer end a hollow plug 68 provided with an inwardly extending sleeve 70 having a diametral bore 72. This sleeve constitutes a stop for a piston to be hereinafter described. The plug 68 is provided with a coupling to which is attached a pipe line 74 connected to the pipe line 26 leading to the cylinder 30 for actuating one of the brakes 18.

The cylinder 60 has threaded in its inner end a hollow plug 76 including a valve seat, and positioned for reciprocation in the cylinder is a piston 78 having a rod provided with a conical portion adapted to engage the valve seat and to effectively close the passage 64. The piston 78 has upon its head a leak-proof cup 80 and positioned on the piston rod between the inner head of the cylinder and the piston is a coil spring normally urging the piston against the sleeve supported by the plug 68. The cylinder 60 has a port back of the piston 74 and this port is connected by a pipe line 82 to the supply tank 20.

A piston 84 is positioned for reciprocation in the cylinder 54. This piston has on its head a leak-proof cup 86 and interposed between the leak-proof cup and the head of the cylinder is a spring 88. On the back of the piston head is a portion having a semi-spherical recess 90 in which is seated a semi-spherical portion formed on one end of a rod 92. The rod extends through an opening in a flexible cap or cover 94 attached to the open end of the cylinder 54. The other end of the rod 92 has thereon a clevis 96 pivotally attached to one end of a lever 98, the other end of which is sleeved on the shackle bolt 34 and suitably keyed thereto as by a screw 100.

A modification of the invention is illustrated in Figure 4. In this modification an arm or lever 101 keyed to the shackle bolt, not shown, is pivotally connected to rods 102 and 104 connected respectively to pistons positioned for reciprocation in opposed cylinders 106 and 108. These cylinders are alike in structure to the cylinders shown in the preferred form of the invention. They are connected by suitable pipe lines 110 and 112 to a coupling 114, which in turn is connected by a pipe line 116 to the supply tank, and by pipe lines 118 and 120 to one of the pipe lines connecting the master cylinder to a brake actuating cylinder. In this structure, upon brake application, the lever 101 is locked against movement in both directions. Accordingly, the structure shown in this modification is effective in both forward and reverse braking.

In operation, assuming that the braking system and the vibration damper control device are filled with a suitable fluid, and that all air has been evacuated, by depressing the foot lever 24 force is applied to the piston in the master cylinder. This causes displacement of fluid from the master cylinder through the pipe lines 26 and 28 to the brake actuating cylinders 30 and 32 and to the cylinder 60 of the control device. The fluid entering each of the brake actuating cylinders between opposed pistons causes these pistons to move apart and to spread the friction elements or shoes into drum engagement, thereby applying the brakes.

Simultaneously with the application of the brakes the piston in the cylinder 60 is actuated to close the passage 62. This effectively checks the flow of fluid from the cylinder 54 through the pipe line 82 to the supply tank 20, and retains the piston 84 in the cylinder 54 against inward movement, thus securing the shackle 38, secured to the piston 84 by suitable linkage, against movement rearwardly upon applying the brakes when the vehicle is moving forward.

It may be found desirable to secure the shackle against movement in both forward and reverse braking, and to that end the arm secured to the shackle bolt is attached to the pistons of opposed cylinders, as illustrated in the modification. In both the preferred and modified forms of the invention the shackle is effectively secured against movement to provide a rigid suspension for the spring, and because of this rigid suspension for the spring the vehicle will not duck to one side upon heavy brake application as in instances where the spring is connected to the frame by a yielding shackle.

Although this invention has been described in connection with certain specific embodiments, the principles involved are susceptible of numerous other applications that would readily occur to persons skilled in the art. The invention is, therefore, to be limited only as indicated by the scope of the appended claims.

Having thus described the various features of the invention, what I claim as new and desire to secure by Letters Patent is:—

1. A control device for motor vehicles comprising brakes, fluid pressure means for operating the brakes, a vibration damper, a fluid cylinder connected to the fluid pressure means for operating the brakes, a piston movable in the cylinder and connected to the vibration damper and subject to vibrations resulting from movement of the damper, and a valve in the cylinder for arresting the flow of fluid to halt movement of the piston.

2. A control device for motor vehicles comprising brakes, fluid pressure means for actuating the brakes, a vibration damper, a fluid cylinder connected to the fluid pressure means for actuating the brakes, a piston movable in the cylinder and connected to the damper and a fluid actuated valve in the cylinder adapted to arrest the flow of fluid in the cylinder upon actuation of the fluid pressure means to apply the brakes.

3. A control device for motor vehicles comprising brakes, fluid pressure means for operating the brakes including a master cylinder, a reservoir connected thereto, brake operating cylinders connected to the master cylinder and a vibration damper, a fluid cylinder connected to the reservoir, a piston movable in the fluid cylinder and connected to the damper, and a fluid actuated valve in the cylinder connected to the master cylinder for operation concomitantly with the operating cylinders for the brakes.

4. A control device for motor vehicles comprising brakes, fluid pressure means for operating the brakes including a master cylinder, a supply reservoir connected thereto, brake operating cylinders connected to the master cylinders, a vibration damper, a fluid cylinder connected to the reservoir, a piston movable in the cylinder having a part connected to the damper, and a fluid actuated valve for the fluid cylinder connected to the master cylinder so that upon actuation of the master cylinder to apply the brake the fluid pressure valve is actuated to arrest the flow of fluid in the fluid cylinder and thereby check the movement of the damper.

5. A control device for motor vehicles comprising brakes, fluid pressure means for actuating the brakes including a master cylinder, a reservoir connected thereto, and brake operating cylinders connected to the master cylinder, and a vibration damper, opposed fluid cylinders connected to the reservoir, pistons movable in the fluid cylinders having connections to the damper, and fluid actuated valves in the fluid cylinders connected to the master cylinder, whereby upon actuation of the master cylinder to apply the brakes the valves in the fluid cylinders are closed to arrest the flow of fluid and to secure the damper against movement.

MYRON W. BOWEN.